(No Model.)
W. A. MURPHY.
CLUTCH.
No. 447,033. Patented Feb. 24, 1891.
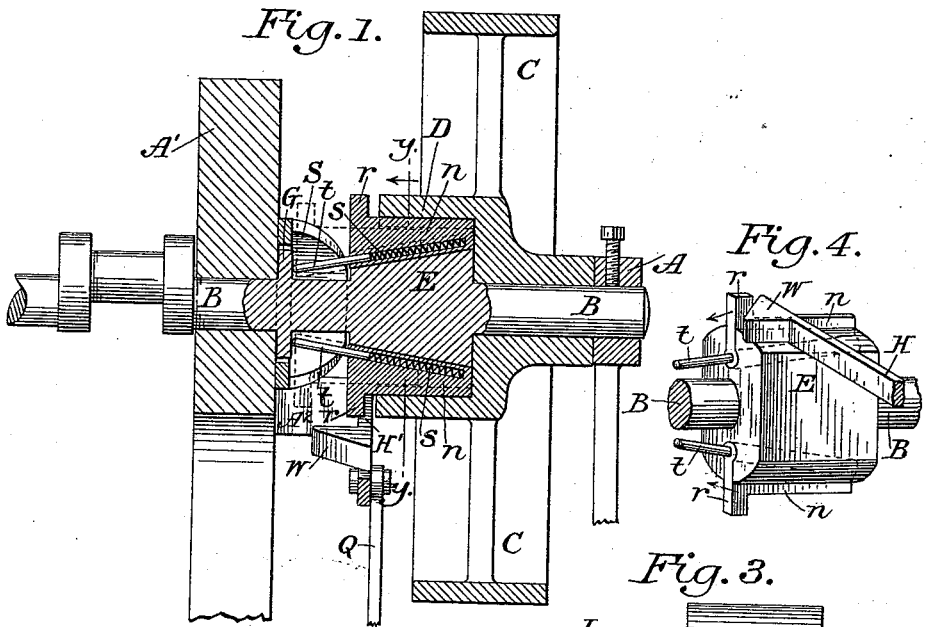
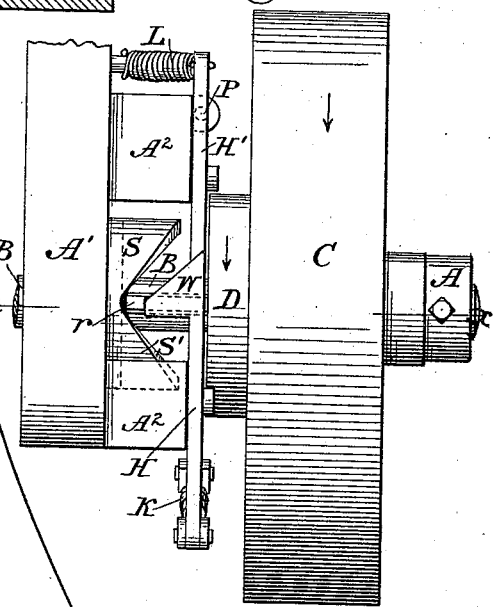
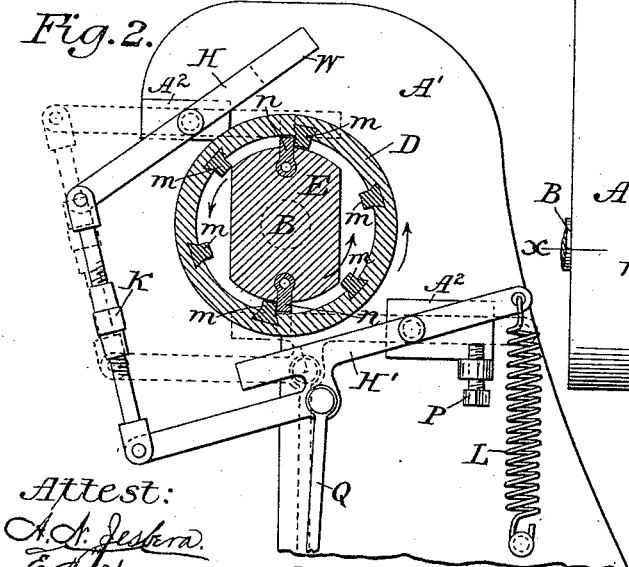
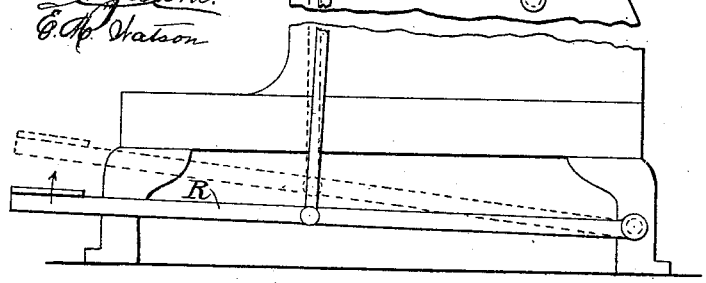
Attest:
A. A. Jeskera
E. H. Watson
Inventor:
William A. Murphy
By David A. Burr
Att'y.

UNITED STATES PATENT OFFICE.

WILLIAM A. MURPHY, OF BROOKLYN, NEW YORK.

CLUTCH.

SPECIFICATION forming part of Letters Patent No. 447,033, dated February 24, 1891.

Application filed December 10, 1890. Serial No. 374,174. (No model.)

*To all whom it may concern:*

Be it known that I, WILLIAM A. MURPHY, of Brooklyn, in the county of Kings and State of New York, have invented certain new and useful Improvements in Clutches; and I do hereby declare that the following is a full and exact description thereof, reference being had to the accompanying drawings, and to the letters of reference marked thereon, making a part of this specification.

My invention relates to an improved clutch for connecting and disconnecting the driving-pulley from the driving-shaft in machines of various descriptions.

The object of my invention is to furnish a simple, reliable clutch, and which is adapted to be coupled or uncoupled by means of a spring-actuated treadle.

It consists in the novel construction and arrangement of parts for the purpose, as is hereinafter fully described and claimed.

In the accompanying drawings, Figure 1 is a longitudinal vertical section of the driving-pulley and clutch mechanism in line $x$ $x$ of Fig. 3, with one of the retracting-wedges omitted, the clutch being in action; Fig. 2, a transverse vertical section in line $y$ $y$ of Fig. 1, showing the arrangement of the treadle (whose depression allows the clutch to spring automatically into action) with the retracting arms and wedges. Fig. 3 is a top or plan view of the mechanism, showing the clutches disengaged by the action of the wedges on the retracting-arms; and Fig. 4 a detached view in perspective of the clutch-head on the shaft, illustrating more clearly the form and arrangement of the clutches seated therein.

Similar letters indicate like parts in all of the figures.

A A' represent the standards or pedestals in which the crank-shaft B of the machine is journaled in the customary manner. The band-pulley C for driving the shaft is mounted to turn loosely thereon next to its outer bearing in the pedestal A', and the hub D of this pulley is recessed at its inner end to receive and embrace a diametric enlargement or head E upon the shaft, which prevents any longitudinal movement of the pulley thereon. The inner periphery of the recess in the hub D and the outer periphery of the head E are concentric, having the axis of the shaft as a center; but the diameter of the head is so far less than that of the encircling portion of the hub as to afford clear space between the two for the movement with the hub of a series of lugs or projecting ribs $m$ $m$, (see Fig. 2,) formed longitudinally or parallel with the axis of the shaft at regular intervals on the inner peripheral face of the recess in the hub. These ribs are preferably formed of strips of steel inserted with a dovetail joint in the inner face of the recess, as shown in Fig. 2 and dotted lines in Fig. 1.

The recessed hub D forms substantially a concentric band projecting from the pulley C to overlap the enlarged portion of the shaft.

The relative positions of the head E and hub D remain constantly the same; but the periphery of the head is longitudinally recessed at diametrically-opposite points thereof, the bottom of each recess being inclined from its inner end next to the pulley outwardly. Within each of these inclined recesses a corresponding longitudinally-tapering or wedge-shaped plate or clutch-key $n$ is inserted, the upper edge of each being at a right angle with its outer end and its lower edge inclined thereto at an angle corresponding with that of the bottom of the recess, as shown in Fig. 1. These clutch-keys $n$ $n$ are left free to slide longitudinally in their seats, and by reason of the inclination of their inner edges will, in their longitudinal movement, be forced out radially as they are pushed inward, and, contrariwise, will drop inwardly as they move outwardly, the constant parallelism of their outer edges with the axis of the shaft being maintained throughout their movement. They are so proportioned in width as that when pushed fully inward toward the hub they will project radially from the head far enough to engage and interlock with the longitudinal ribs $m$ $m$ on the inner face of the hub, and thereby prevent the independent revolution of the pulley and lock it to the shaft.

The two longitudinally-sliding clutch-keys $n$ $n$ are carried inward when left free, so as to automatically lock the pulley by means of spiral springs $s$ $s$, fitted in longitudinal recesses formed to receive them in each key parallel with the inclined edge thereof, and which engage the ends of rods $t$ $t$, inserted in said recesses, to project therefrom into contact with a collar G, formed on the shaft B, as shown in Fig. 1. As the clutch-keys are forced outward from their seats in the hubs, the rods, arrested by the collar G, will operate to compress the springs s s, whose resiliency, when left free, will operate to force back the keys on the rods. Hence normally the clutch-keys will be automatically carried and held in their inward or locking position by the action of the springs s s upon the rods t t, as shown in Figs. 1 and 2, so that the pulley C will engage and drive the shaft B.

The release of the clutch to allow the pulley to run free and the shaft to become idle is produced by forcing the clutch-keys n n outward from the hub D. This is readily accomplished by means of two levers H H', pivoted on opposite sides of the shaft, and respectively above and below it, to swing in a plane at a right angle with its axis. Each of these retracting-levers terminates at the end thereof next to the shaft in a wedge-shaped head W. (See Fig. 3.) The levers are pivoted to the inner standard or pedestal A', or to offsets A² formed thereon, in such position as that when the clutch-keys n n are in their normal operative position the wedge-shaped heads W W may each be carried into a horizontal position with the point of the wedge engaging the inner face of a lug r, formed on the upper outer edge of the corresponding clutch-key. When this occurs, the movement of the key along the inclined face of the wedge, as the key revolves with the band-pulley C, will operate to draw the key outward upon said inclined edge until by its outward movement the key becomes disengaged and freed from the clutch-ribs m on the hub of the pulley, and thereby comes to a standstill, as shown in Fig. 3.

The two retracting-levers H H' are coupled together to move in unison into their operative position, as described, by means of an adjustable link K, Fig. 2, and are automatically carried into said operative position by means of a spring L, attached to the outer arm of the lever H', as shown in Fig. 2. A set-screw P controls the movement of said lever H', and permits of an adjustment of the operative position of the retracting-levers. The levers are connected by a link Q with treadle R, so that by a pressure of the foot upon the treadle the levers will swing out of their operative position and free the clutches and allow them to slide inward and connect the shaft with the band-pulley. The return of the clutch-keys to their operative positions may be made positive by means of stationary cams S and S', fixed upon the face of the pedestal A' near to the pulley, the edge of each cam being made to embrace a semicircle, presenting a double inclined face (see Fig. 1) forming a central apex projecting toward the keys, the re-entrant spaces between the two cams being in line with the widest portions of the two wedge-shaped heads W W of the retracting-levers H H', when the latter are in their operative positions, as shown in Fig. 3. Hence so soon as by a withdrawal of the retracting-levers the clutch-keys are permitted to move inward far enough to lock the shaft B so that it shall commence to rotate the ends of the keys will be brought in their revolution against the inclined faces of the cams S S', and moving over the same will be positively forced inward thereby, the cams operating as an auxiliary to the springs s s for this purpose.

I claim as my invention—

1. The combination, with a revoluble shaft having a radial enlargement, of a driving-wheel turning loosely upon the shaft next to said enlargement and having a recessed hub or concentric collar adapted to overlap and encircle said enlargement, one or more wedge-shaped keys fitted to slide longitudinally in longitudinally-inclined seats formed radially in the enlarged portion of the shaft to engage inwardly-projecting ribs on the inner periphery of the encircling portion of the hub, a spring-seated pin projecting from the outer end of each key to bear against an opposed offset or collar on the shaft, and means, substantially as described, for retracting the clutch-key against the stress of its spring-actuated pin, substantially in the manner and for the purpose herein set forth.

2. The combination, with a revoluble shaft having a radial enlargement, of a driving-wheel turning loosely upon the shaft next to said enlargement and having a recessed hub or concentric collar adapted to overlap and encircle said enlargement, one or more wedge-shaped keys fitted to slide longitudinally in longitudinally-inclined seats formed radially in the enlarged portion of the shaft to engage inwardly-projecting ribs on the inner periphery of the encircling portion of the hub, a spring-seated pin projecting from the outer end of each key to bear against an opposed offset or collar on the shaft, and a pivoted lever having a wedge-shaped head adapted to be swung into engagement with the outer end of the key to force it outward against the stress of its spring as the shaft is rotated, substantially in the manner and for the purpose herein set forth.

3. The combination, with the revoluble shaft, the driving-pulley revolving loosely thereon, and the enlargement of the shaft encircled by the hub of the pulley, of the longitudinally-sliding inclined keys fitted radially on said enlargement to move into engagement with the inner face of said hub, wedges carried by retracting-levers to engage said keys and force them outwardly to free them from engagement with the hub, springs to carry them inward, and a treadle actuating said retracting-levers, substantially in the manner and for the purpose herein set forth.

4. The combination, with the revoluble shaft, the driving-pulley revolving loosely thereon, and the enlargement of the shaft encircled by the hub of the pulley, of the longitudinally sliding inclined keys fitted radially in said enlargement to move into engagement with the inner face of said hub, wedges carried by retracting-levers to engage said keys and force them outwardly to free them from engagement with the hub, springs to carry them inward, a treadle actuating said retracting-levers, and cams fixed in position to engage the outer end of the keys and force them inward as the shaft revolves, substantially in the manner and for the purpose herein set forth.

5. The combination, with a revoluble shaft and a driving-pulley revolving loosely thereon and having a recessed hub or concentric collar projecting laterally therefrom, of radial inclined-faced clutch-keys sliding longitudinally in inclined ways formed upon the shaft into engagement with radial lugs within the concentric collar projecting from the pulley, and means, substantially as described, for producing a longitudinal movement of said clutch-keys, substantially in the manner and for the purpose herein set forth.

In testimony whereof I have signed my name to this specification in the presence of two subscribing witnesses.

WILLIAM A. MURPHY.

Witnesses:
A. N. JESBERA,
E. M. WATSON.